March 14, 1933.  H. V. McCARTY  1,901,564
CARBURETOR
Filed May 25, 1928   2 Sheets-Sheet 1
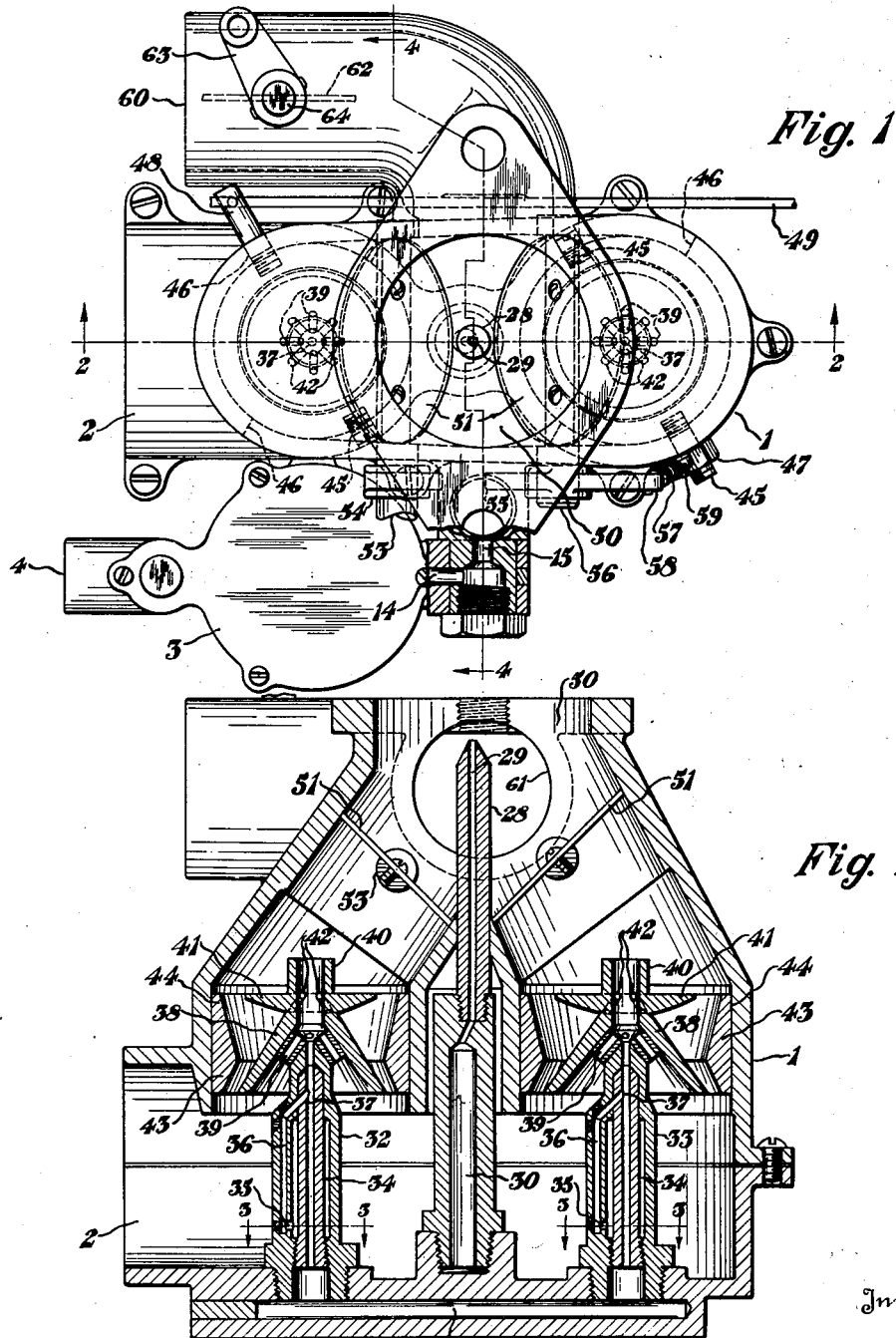
Fig. 1
Fig. 2
Fig. 3
Inventor
Harvey V. McCarty
By 
Attorney March 14, 1933.  H. V. McCARTY  1,901,564

CARBURETOR

Filed May 25, 1928  2 Sheets-Sheet 2

Inventor
Harvey V. McCarty
By Harry Frease Attorney

Patented Mar. 14, 1933

1,901,564

UNITED STATES PATENT OFFICE

HARVEY V. McCARTY, OF CANTON, OHIO

CARBURETOR

Application filed May 25, 1928. Serial No. 280,465.

The invention relates to carburetors and the object of the improvement is to provide a carburetor, preferably of dual jet type, each jet being provided with a cone, a sliding Venturi sleeve being arranged to vary the air intake therethrough.

Figure 4:
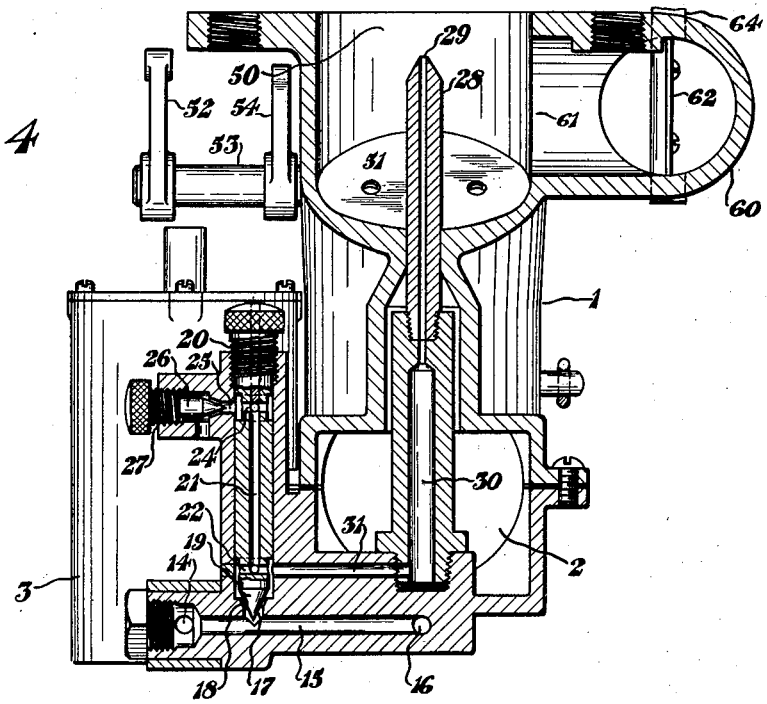

The above and other objects may be attained by constructing the carburetor in the manner illustrated in the accompanying drawings, in which Figure 1 is a plan view of the improved carburetor, parts being broken away for the purpose of illustration;

Fig. 2, a section on the line 2—2 of Fig. 1;

Fig. 3, a section through one of the jets taken as on either of the lines 3—3, of Fig. 2;

Fig. 4, a section on the line 4—4, of Fig. 1; and

Figure 5:
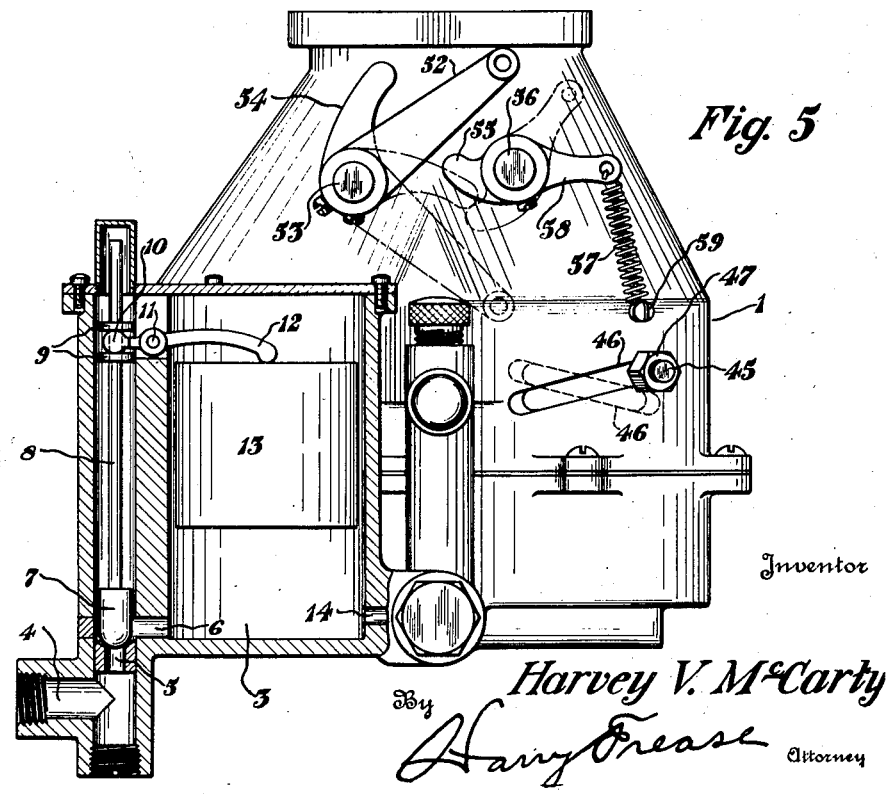

Fig. 5, an elevation of the improved carburetor, the float chamber being shown in section.

Similar numerals refer to similar parts throughout the drawings.

The housing of the carburetor is indicated generally at 1 and is provided with the usual air intake 2 and float chamber 3.

The gasoline inlet 4 to the float chamber communicates with the vertical passage 5 having an outlet branch 6 into the lower portion of the float chamber. A valve 7 is arranged to control the admission of gasoline through the passage 5 to the chamber.

This valve is provided with the vertical slidably mounted stem 8 having the spaced collars 9 between which is engaged one end 10 of a lever pivoted as at 11, the other end 12 thereof contacting with the upper end of the float 13.

As the gasoline reaches a sufficient level within the float chamber to raise the float to the position shown in Fig. 5, the valve 7 will be lowered, closing the passage 5 and preventing further gasoline from being admitted to the float chamber until the level of gasoline therein has been lowered.

An outlet 14 from the float chamber communicates with the passage 15 terminating at the center of the angularly disposed passage 16. At an intermediate portion the passage 15 communicates with the upright passage 17 having the valve seat 18 therein for receiving the needle valve 19 which may be adjusted as by the screw threads 20.

The needle valve 19 is provided with the central longitudinal bore 21 communicating at its lower end with the transverse openings 22 and at its upper end with similar transverse openings 24 which register with the air inlet 25, a needle valve 26 being adjustably mounted, as by threads 27, for regulating the air inlet.

The idling jet 28 may be centrally located within the carburetor housing and provided with the central bore 29, the lower portion of which may be enlarged as at 30 and connected with the horizontal passage 31 which communicates with the gasoline inlet passage 17 at a point adjacent to the transverse openings 22 in the needle valve 19.

The low speed jet 32 and high speed jet 33 may be located upon opposite sides of the idling jet.

An annular chamber 34 surrounds each of these jets, communicating at its lower end, as at 35, with a passage 36 which communicates at its upper end with the interior bore 37 of the jet.

As gasoline is drawn upward through the bore 37 of the jet, a vacuum will be created in the passage 36 and chamber 34, tending to cause a more smooth and even flow thereof, breaking up any air bubbles in the gasoline.

Each jet 32 and 33 extends into a cone 38, a series of openings 39 surrounding the tip of the jet within the cone.

The cone has the cylindrical upstanding neck 40 surrounded by the annular flange 41 and a plurality of inclined openings 42 may be located through said flange from the exterior to the interior of the neck.

A Venturi sleeve 43 surrounds each of the cones and is adapted to be moved toward or from the same in order to regulate the amount of air passing around the cone.

The sleeves 43 may be operated to move vertically within the cylindrical passages 44 and for the purpose of operating the same, studs 45 may be fixed upon the sleeve as shown on the high speed side of the carburetor, these studs extending through inclined slots 46 in the housing 1, nuts 47 being provided upon the threaded extremities of the studs for holding the sleeve in adjusted position.

Where it is desirable to frequently change the adjustment of the sleeve, a stud 48 may extend through one of the inclined slots, as shown upon the low speed side of the carburetor, this stud being connected as by the rod 49 to any suitable operating mechanism upon the dash or instrument board of the car, whereby the sleeve may be readily adjusted to any desired position.

The cylindrical passages 44 converge toward a common opening 50 and each may be controlled as by a butterfly valve 51.

Thus if one of the dual jets 32 and 33 becomes temporarily clogged, as for instance jet 32, the sleeve 43 controlling the flow of air through the surrounding passage may be adjusted to close off the passage and the butterfly valves 51 may then be operated, the butterfly valve 51 in the passage surrounding jet 32 becoming ineffective and the other valve 51 operating to supply fuel mixture from the passage surrounding jet 33 into the common opening 50. The automobile may then be operated satisfactorily even though jet 33 is functioning alone.

A rocker arm 52 may be fixed upon the shaft 53 carrying the valve upon the low speed side of the carburetor. A finger 54 may be fixed upon this shaft and arranged to engage the lug 55 upon the shaft 56 of the high speed valve. A spring 57 is connected to the arm 58 upon the shaft 56 and to a stud 59 upon the outside of the housing, tending to normally hold the high speed valve in closed position.

The lever 52 may be connected by a rod or the like with the usual throttle. As the low speed valve is partially opened the finger 54 will engage the lug 55, starting to open the high speed valve, and as the low speed valve is fully opened, the arm 54 will be moved to the dotted line position shown in Fig. 5, engaging the lug 55 upon the shaft 56 and opening the high speed valve.

If desired, auxiliary air may be admitted by means of the inlet neck 60 which communicates with the juncture of the cylindric passages 44 as at 61, a butterfly valve 62 being located therein for controlling the admission of auxiliary air.

A lever 63 may be fixed upon the shaft 64 of said valve and operated from the dash in any usual manner.

Referring to Fig. 2, the Venturi sleeves 43 are flared upward and inward from their bottom peripheral edge, and thence are flared upward and outward. The cones 38 are tapered upwardly so that the lower peripheral portions thereof will contact with the upwardly and inwardly flared portion of the Venturi sleeves 43 when the Venturi sleeves are moved downward by adjusting the studs 45 in the inclined slots 46.

I claim:

1. A carburetor including a jet, a cone associated with the jet, and a reduced neck at the apex of said cone, said neck having apertures therethrough communicating between the jet and the exterior of the cone.

2. A carburetor including a housing, a jet within the housing, a cone associated with the jet, a Venturi sleeve surrounding the cone, the sleeve having an upwardly and inwardly flared portion and an upwardly and outwardly flared portion, the cone being upwardly tapered relative to the sleeve for cooperating with the upwardly and inwardly flared portion of the sleeve, an annular flange at the upper portion of the cone adjacent the upwardly and outwardly flared portion of the sleeve, and means for changing the relative position of the sleeve and cone.

3. A carburetor including a housing, a jet within the housing, a cone associated with the jet, a Venturi sleeve surrounding the cone, the sleeve having an upwardly and inwardly flared portion and an upwardly and outwardly flared portion, the cone being upwardly tapered relative to the sleeve for cooperating with the upwardly and inwardly flared portion of the sleeve, an annular flange at the upper portion of the cone adjacent the upwardly and outwardly flared portion of the sleeve, means effecting communication between the jet and the intersection of the flange and cone, and means for changing the relative position of the sleeve and cone.

4. A carburetor including a housing, an idling jet within the housing, a low speed jet within the housing, a gasoline inlet communicating with all of the jets, a cone associated with the low speed jet, a Venturi sleeve surrounding the cone, the sleeve having an upwardly and inwardly flared portion and an upwardly and outwardly flared portion, the cone being upwardly tapered relative to the sleeve for cooperating with the upwardly and inwardly flared portion of the sleeve, and means for changing the relative position of the sleeve and cone.

5. A carburetor including a housing, an idling jet within the housing, a low speed jet within the housing, a gasoline inlet communicating with all of the jets, a cone associated with the low speed jet, a Venturi sleeve surrounding the cone, the sleeve having an upwardly and inwardly flared portion, the cone being upwardly tapered relative to the sleeve for cooperating with the upwardly and inwardly flared portion of the sleeve, and means for moving the upwardly and inwardly flared portion of the sleeve toward and from the cone.

In testimony that I claim the above I have hereunto subscribed my name.

HARVEY V. McCARTY.